Figure 1:
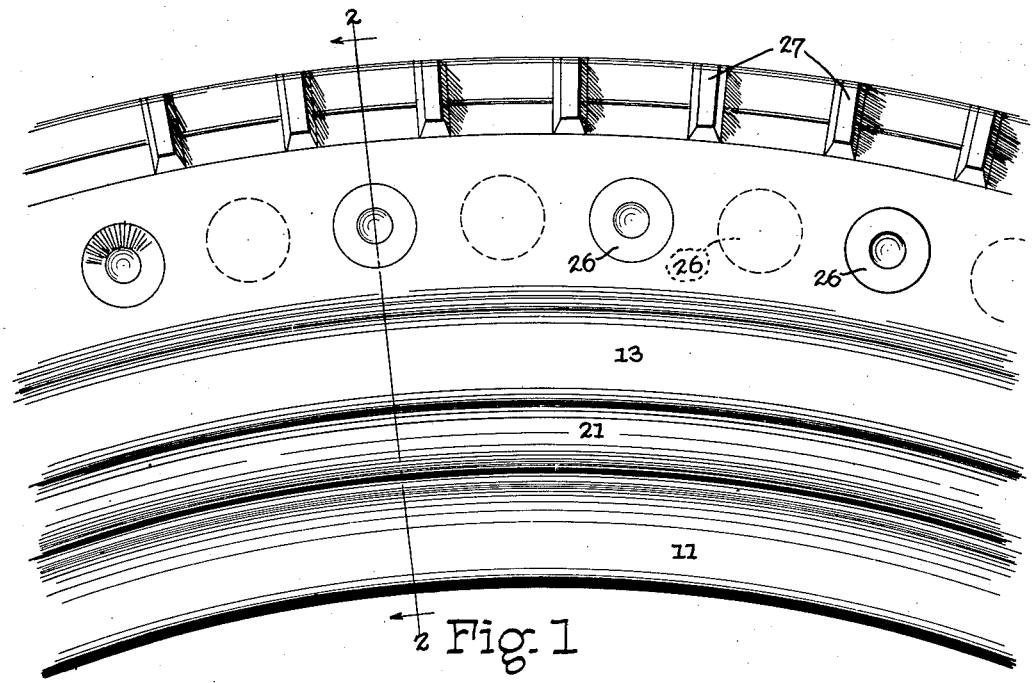

July 14, 1925.

C. NEIMEYER ET AL

TIRE

Filed Jan. 5, 1924

Charles Neimeyer
& William A. Brubaker
Inventors

Patented July 14, 1925.

1,545,844

UNITED STATES PATENT OFFICE.

CHARLES NEIMEYER, OF LITTLE ROCK, ARKANSAS, AND WILLIAM A. BRUBAKER, OF AKRON, OHIO.

TIRE.

Application filed January 5, 1924. Serial No. 684,661.

*To all whom it may concern:*

Be it known that we, CHARLES NEIMEYER, a citizen of the United States, residing at Little Rock, in the county of Pulaski and State of Arkansas, and WILLIAM A. BRUBAKER, a citizen of the United States, residing at Akron, in the county of Summit and State of Ohio, have invented certain new and useful Improvements in Tires, of which the following is a full, clear, and exact description.

Figure 2:
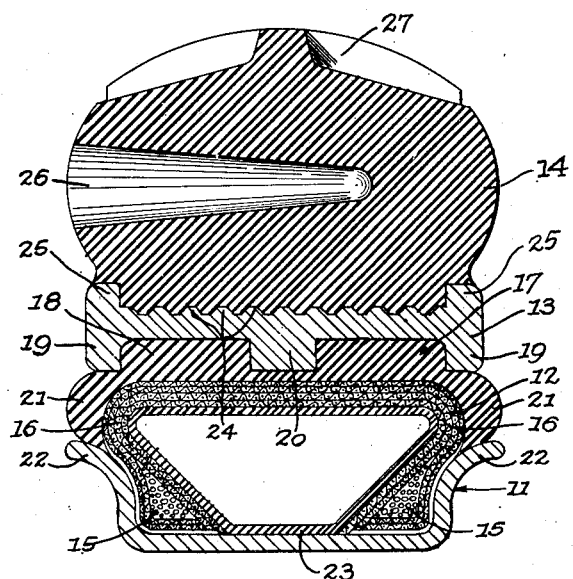

Because of the annoyance and loss occasioned by the punctures which invariably occur in pneumatic tires cushion tires are being substituted to a considerable extent on commercial vehicles. However, it has been found that these cushion tires by no means possess the resiliency and flexibility of a pneumatic tire and are by no means the equivalent thereof or a full substitute therefor and accordingly this substitution has neither been entirely satisfactory nor extended to pleasure vehicles. Our invention provides a combination pneumatic and cushion tire which we find possesses all of the advantages of both and apparently none of the defects. In the drawings accompanying this specification and forming a part thereof we have shown, for purposes of illustration, one form which our invention may assume. In these drawings:

Figure 1 is a side elevation of this illustrative embodiment of our invention, while Figure 2 is a section on the line 2—2 of Figure 1.

The embodiment of our invention herein shown comprises a pneumatic casing rim 11, a pneumatic casing 12 mounted thereon, a cushion tire rim 13 mounted upon the casing 12, and a cushion tire 14 mounted on the cushion tire rim 13. The casing 12 is herein shown as provided with suitable bead portions 15, with extremely short side wall portions 16, and with a substantially flat tread portion 17 carrying a closed tread 18 embossed to cooperate with the side rings 19 and center rib 20 of the inner face of the cushion tire rim 13. In addition, the tread 18 is extended laterally of the side wall portions 16 to form ribs 21 disposed between the side rings 19 of the cushion tire rim 13 and the outwardly extending flanges 22 of the pneumatic tire rim 11 and effective to prevent pinching of the casing 12 between the rims 11 and 13. The casing 12 of course contains an inner tube 23 which may be of the usual variety except that it will be of a cross section reduced to correspond to the reduced cross section of the casing 12.

The cushion tire rim 13 is provided on its outer face with the corrugations 24 and ribs 25 commonly employed to increase the adhesion between a cushion tire rim and the tire mounted thereon, while the cushion tire 14 is provided with a plurality of pockets 26 extending therein from opposite sides in staggered relation and with a suitable nonskid tread 27 and is also formed of reduced height so that the external diameter of the construction herein shown is no greater than the external diameter of the usual oversize cord tire.

It will be obvious from the above disclosure that because of the interposition of the cushion tire and its rim between the road and the pneumatic casing the pneumatic casing will be protected from wear and puncture and the tire will possess the wearing qualities of a cushion tire but it will also be obvious that because of the presence of the pneumatic casing between the cushion tire rim and the felly the construction will possess the easy riding qualities and full resilience of a pneumatic casing. In addition, it will be obvious to those skilled in the art that the particular construction herein disclosed may be variously changed and modified without sacrificing the advantages of our invention or departing from the spirit thereof and it will therefore be understood that the disclosure herein is illustrative only and our invention not limited thereto.

We claim:

1. In combination, an inner rim, a closed tread pneumatic casing carried thereby and provided with an embossed tread, an outer rim carried by said casing and having an inner face arranged to cooperate with the embossing on said tread and having its edges spaced radially from the flanges of said inner rim, a tire carried by said outer rim, and ribs extending laterally from the sides of said casing between the flanges of said inner rim and the edges of said outer rim.

2. In combination, an inner rim, a closed tread pneumatic casing carried thereby and provided with a ribbed tread, an outer rim carried by said casing and having an inner face arranged to cooperate with the ribs on said tread and having its edges spaced radially from the flanges of said inner rim, a tire carried by said outer rim, and ribs extending laterally from the sides of said casing between the flanges of said inner rim and the edges of said outer rim.

3. In combination, an inner rim, a closed tread pneumatic casing carried thereby, an outer rim carried by said casing and having its edges spaced radially from the flanges of said inner rim, a tire carried by said outer rim, and ribs extending laterally from the sides of said casing between the flanges of said inner rim and the edges of said outer rim.

In testimony whereof, we hereunto affix our signatures.

WM. A. BRUBAKER.
CHAS. NIEMEYER.